S. M. JONES.
PACKING.
APPLICATION FILED JUNE 13, 1908.

914,422.

Patented Mar. 9, 1909.

Witnesses:
W. C. Smith
A. L. Ekvall

Inventor:
Scott M. Jones,
By Joshua R. H. Potts,
Atty.

UNITED STATES PATENT OFFICE.

SCOTT M. JONES, OF CHICAGO, ILLINOIS.

PACKING.

No. 914,422.  Specification of Letters Patent.  Patented March 9, 1909.

Application filed June 13, 1908. Serial No. 438,315.

*To all whom it may concern:*

Be it known that I, SCOTT M. JONES, a citizen of the United States, residing at Chicago, county of Cook, and State of Illinois, have invented certain new and useful Improvements in Packings, of which the following is a specification.

My invention relates to packing or gaskets for pistons, valves, flanged pipe-joints, etc.

The object of my invention is to provide a device as mentioned, which will be adapted to form an efficient air and water tight packing, and to provide a packing which is particularly adapted for use in pipes, pistons, etc. which are under great pressure.

A further object of my invention is to provide a packing which shall be strong, durable, simple of construction, hence of low cost to manufacture.

Other objects will appear hereinafter.

With these objects in view my invention consists generally in a suitable practically non-elastic but readily malleable metal core, covered or incased by a suitable elastic material possessing qualities which especially adapt it for use as an effective seal, said core and casing being adapted to be formed into any desired shape according to the specific use to which it is to be put.

Figure 1:
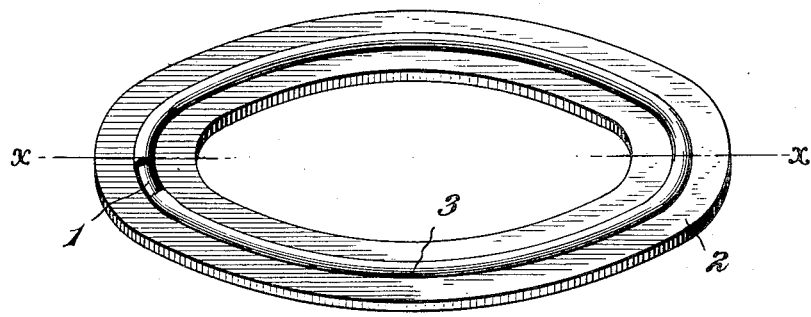
Figure 2:
Figure 3:

My invention will be more readily understood by reference to the accompanying drawings forming a part of this specification, and in which, Figure 1 is a perspective view of my device in its preferred form, a portion of the outer elastic casing being broken away so as to expose the core, Fig. 2 is a vertical section taken on the line *x—x* of Fig. 1, and Fig. 3 is a vertical section similar to Fig. 2 showing a modified form of my device.

Referring now to the drawings, 1 indicates a non-elastic readily malleable metal core preferably formed of copper wire although any suitable metal having properties as stated, such as lead, may be used. As shown in the drawings, the wire or core is preferably formed into a ring. In this case, the ends of the metal wire, when copper is used, are preferably electrically welded together, so as to facilitate making all parts or points of the ring equally as strong, and better adapted to withstand a great tensile strain, as is the case when pipes or pistons, etc. in which the packing in which said wire cord is formed, is used are under high pressure. The core 1 is preferably formed centrally in a flattened washer-like ring 2, said ring being of any suitable elastic material preferably rubber. A thin ridge-like coating or casing 3 is formed integrally with and of the same material as the member 2 over the metal member 1. Said coating 3 serves merely to hold the core 1 in place in the member 2 when applying the device.

Packing or gaskets in general use at the present time, are inefficient inasmuch as they are not susceptible to a high tensile strain, hence when they are under high pressure are not infrequently blown out. It is to eliminate this inefficiency that the wire or core is formed in the elastic sealing material, thus obviously adding to the tensile strength of said sealing material. A non-elastic but readily malleable metal core, such as copper or lead, is used because of its being adapted to be bent, flattened or compressed into shapes corresponding to the seat or recess into which the packing is to be fitted, and thus in no way interfering, with the rubber or other elastic material used, in forming a close and effective seal.

The modified form of my packing shown in Fig. 3 is practically the same as the form shown in Figs. 1 and 2, except that two wires or cores instead of one are formed in the member 2. Said form is to be used in pipes, pistons, etc. where the same are to be under exceedingly high pressure, consequently necessitating more strengthening of the sealing material, hence the reason for forming two wires instead of one in said sealing material. In the drawings, I have shown two wires or cores embedded in the sealing material, it is understood however, that any number may thus be formed in the same without departing from the spirit of my invention.

Having described my invention what I claim as new, and desire to secure by Letters Patent, is:

1. A packing consisting of a flat annular rubber member and an endless ring of malleable metal partially embedded in one face of said rubber member and completely covered with rubber, substantially as described.

2. As an article of manufacture, a flat, annular, rubber gasket and an endless ring of malleable metal partially embedded in one side of said gasket and extending above the face thereof, substantially as described.

3. As an article of manufacture, a flat, annular, rubber gasket and a plurality of endless rings of malleable metal embedded therein, said rings being of different diameters and arranged concentrically, substantially as described.

In testimony whereof I have signed my name to this specification in the presence of two subscribing witnesses.

SCOTT M. JONES.

Witnesses:
JANET E. HOGAN,
HELEN F. LILLIS.